United States Patent [19]
Ehrhart

[11] Patent Number: 4,641,846
[45] Date of Patent: Feb. 10, 1987

[54] INTERLOCK SYSTEM FOR A TRAILER AND BOGIE

[75] Inventor: Leonard M. Ehrhart, Charleston, Ill.

[73] Assignee: Trailmobile Inc., Chicago, Ill.

[21] Appl. No.: 763,945

[22] Filed: Aug. 8, 1985

[51] Int. Cl.$^4$ .............................................. B60G 5/06
[52] U.S. Cl. .................................................. 280/80 B
[58] Field of Search ............... 280/80 B, 688, 144, 280/80 R, 43.15, 43.16

[56] References Cited

U.S. PATENT DOCUMENTS 4,286,797  9/1981  Mehosh et al. ................... 280/80 B
4,353,565  10/1982  Smith et al. ........................ 280/80 B Primary Examiner—Richard A. Bertsch
Attorney, Agent, or Firm—Richard J. Myers

[57] ABSTRACT

A device for securing a bogie at predetermined positions on a trailer hitched to a tractor, having a pair of spaced housings secured to a cross beam of the bogie and supporting a pair of pins adapted to secure the bogie to tracks on the trailer, the pins being tandemly controlled by a handle which is also coupled by an adjusting member to a control valve connected between a source of pressured air on the tractor and the brake system on the bogie. When the pins are in an engagement with the trailer, the control valve is actuated to release the bogie brake system. When the pins are not in engagement, the control valve is actuated to vent to atmosphere the pressurized air thereby leaving the brake system operative. A lock pin is used to secure the handle in the engaged position.

12 Claims, 4 Drawing Figures

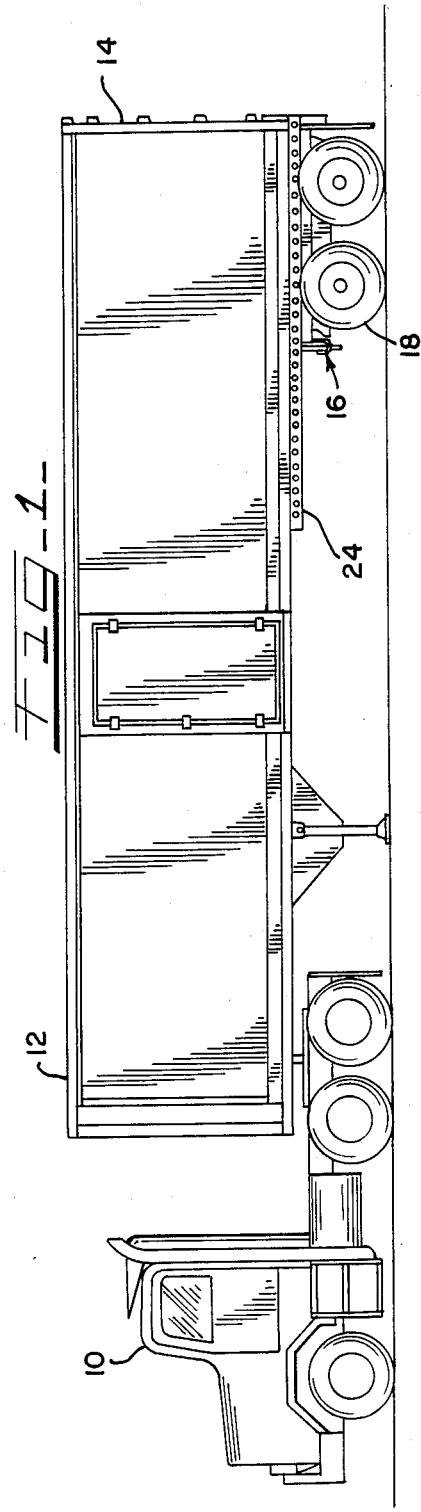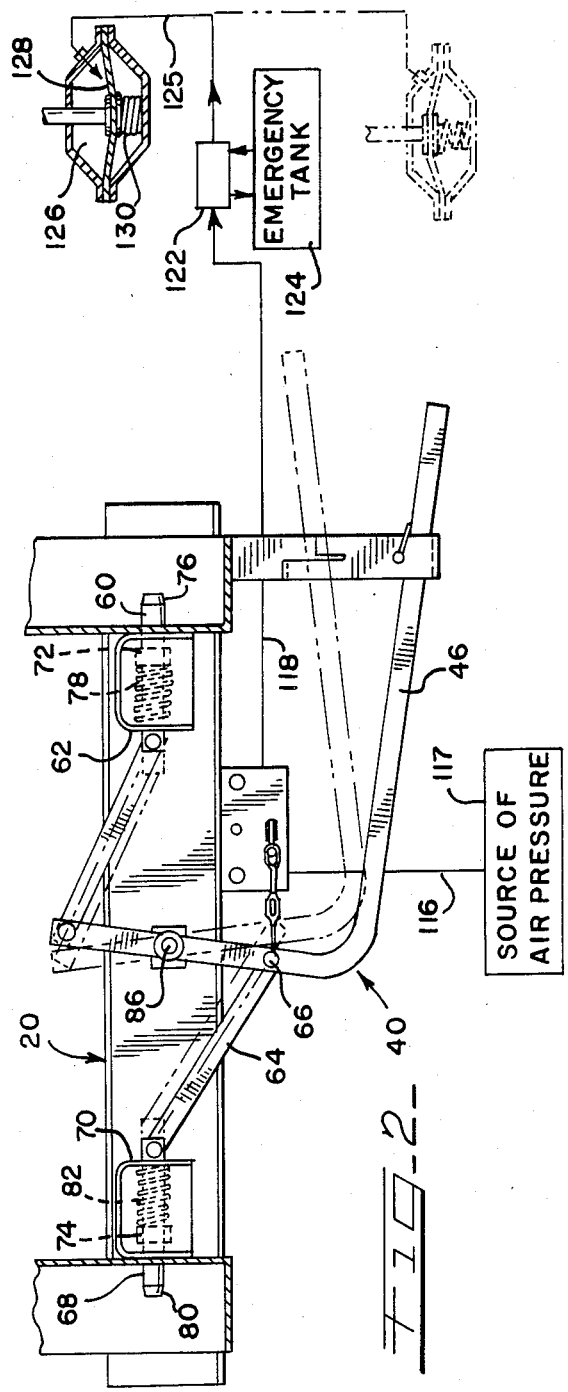

INTERLOCK SYSTEM FOR A TRAILER AND BOGIE

BACKGROUND OF THE INVENTION

1. Field of Invention

This invention relates to an over-the-road vehicle such as a trailer, wherein a wheel assembly commonly known as a bogie is coupled to the body of the trailer, the coupling between the trailer and the bogie can be adjusted so that the bogie can be shifted with respect to the body to vary the load on the axles in the bogie. Alternatively, the bogie can be removed entirely so that the trailer can be shipped in the form of a containerized cargo unit to be transported by a railcar, ship or other form of vehicle.

2. Description of the Prior Art

The bogie which includes wheels, brakes, a subtrain suspension and other items is attached to the trailer by a positive locking mechanism. This locking mechanism on the bogie generally includes two or more heavy steel pins which secure the bogie in fore and aft directions with respect to the trailer body. The bogie includes a pair of rails which are adapted to slide in a pair of tracks secured to the bottom of the trailer body, which tracks guide the bogie for movement for adjusting the position of the bogie with respect to the longitudinal length of the trailer body.

One form of attaching the bogie to the trailer body is described in the U.S. Pat. No. 4,273,347, wherein the locking pins have a particular configuration and are adapted to function as valves in a mechanical locking system. The pins have a central portion supporting a pair of spaced "O" rings, the central portion communicating with a pair of conduits which are connected to a source of air supply and to an emergency tank connected to the mechanical brake system on the bogie. If the pin is not properly inserted to couple the bogie to the trailer body, the central portion of pin is off-center with respect to the pressure lines and therefore the air supply provided by a tractor hitched to the trailer body will be vented to the atmosphere and will, therefore, not release the mechanical brake system on the bogie. Such pins, and "O" rings acting as movable valve bodies are subject to corrosion and malfunction because of dirt. Also, it requires that the housing supporting the pins be constructed as a cylinder for supporting the movable pins.

The foregoing pins are always biased in an outwardly direction seeking to interlock the rails on the bogie with the tracks on the trailer body. This is achieved by a spring member which is externally located and subject to corrosion as well as breaking. Should such a spring which actuates in tandem a pair of pins break, separation between the bogie and trailer body could readily occur.

SUMMARY OF THE INVENTION

It is the primary object of this invention to provide fail-safe means which will prevent separation of the bogie from the trailer body.

Another object of the invention is a fail-safe interlock system which requires no alteration of the coupling mechanism or the brake system already in use but simply an addition of a control valve device.

A still further object of the invention is to provide biasing means for biasing the pins in such manner that the biasing means is completely protected from external exposure.

Another object of the invention is to provide a novel actuating handle for the interlock system for selectively withdrawing in tandem, pins from a locking position between the trailer body and the bogie, while utilizing the mechanism of existing trailer body and bogie.

In accordance with the present invention, a bogie, having wheels normally braked by independent mechanical brake means (when the trailer is uncoupled from the tractor) includes a pair of rails for slidable engaging and positioning within a pair of tracks on the bottom of the trailer body. Two or more pins mounted on the bogie are adapted to pass through openings in the tracks to secure the bogie to the trailer body. The interlock system includes means for connecting a source of air pressure to the brake chambers in the bogie braking system to overcome the braking provided by the bogie independent mechanical means when the pins are properly inserted through the openings in the tracks. If the pins are not properly inserted, the mechanical braking on the bogie continues to be applied and the bogie cannot be moved. The pins are worked in tandem by a locking pin handle coupled to a pair of oppositely disposed pins. The handle is coupled by an adjustable linkage to a control valve generally located on the bogie between a pair of pins. The valve is provided with a toggle connected to the adjustable linkage. When the pins properly interconnect the bogie to the trailer body, the air pressure from the tractor is applied in a known manner to the braking mechanical braking system on the bogie to thereby release the brakes. If the handle is not in a position to properly interlock the pins between the bogie and the trailer body, the adjustable linkage exerts a force on the toggle to open up the control valve to vent to the atmosphere the air pressure supplied by the tractor. To prevent accidental movement of the handle a safety pin is provided to maintain the handle, in proper locked position.

BRIEF DESCRIPTION OF THE DRAWINGS

The foregoing objects of the invention, as well as other objects, will become apparent as the following description proceeds in combination with the accompanying drawings, wherein;

FIG. 1 is a side view of a tractor drivingly connected to a trailer body having a rear end supported by a bogie;

FIG. 2 is an end view taken below the trailer body illustrating the interlock system for locking and unlocking the bogie to the trailer body;

DESCRIPTION OF THE PREFERRED EMBODIMENT

Figure 3:
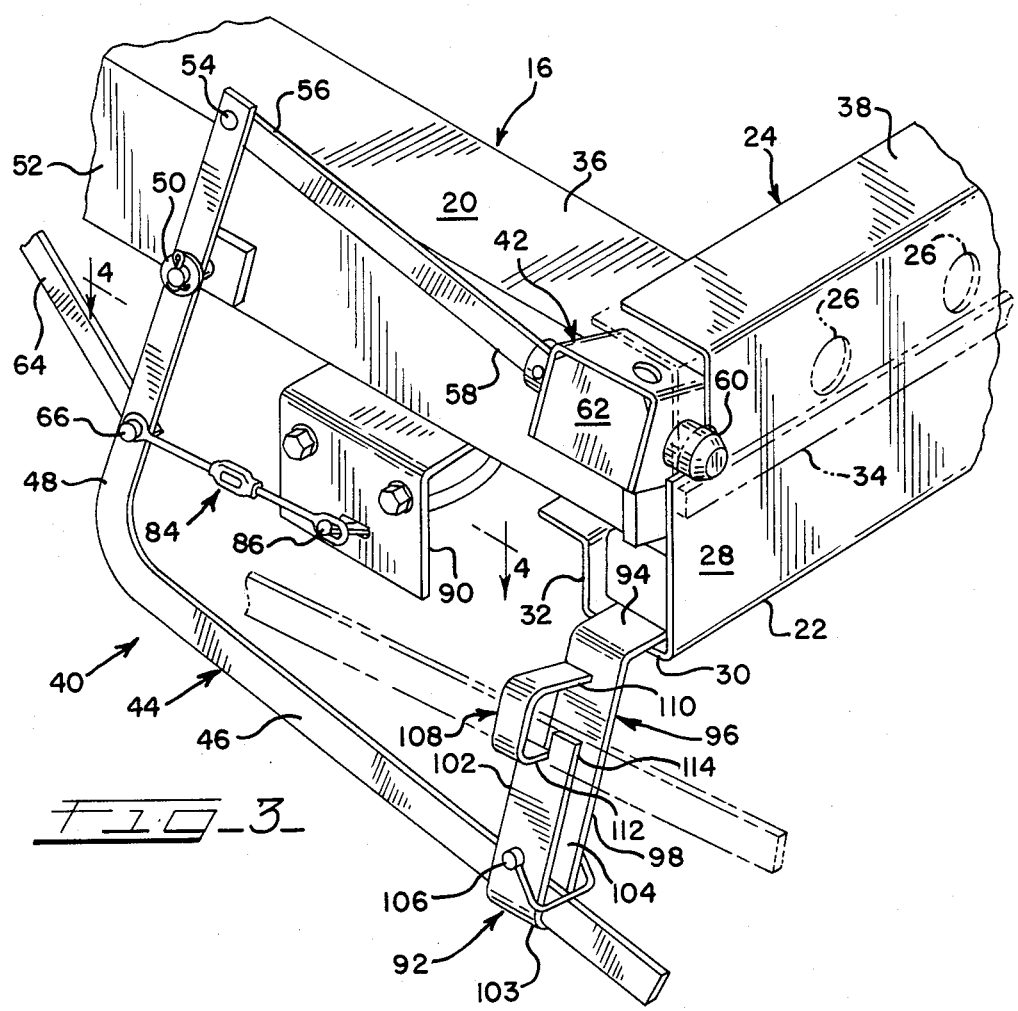
FIG. 3 is a large partial view of the interlock system.

The interlock system for a trailer and a bogie is illustrated in FIGS. 1–4. As shown in FIG. 1, a tractor 10 is drivingly engaged for transport with a trailer 12, which has a rear 14 secured to a bogie 16. As is well known, the bogie includes wheels 18, brakes, subframe, suspension and other items which are not concerned with the present invention.

As shown, particularly FIG. 3, the bogie 16 comprises a cross beam 20 interconnecting a pair of rails 22 (only one shown) engaged with a track 24 secured to the bottom of the trailer 14.

The track 24 has a series of holes 26 which are spaced from each other at predetermined distances. Each rail 22 has a vertically extending wall 28, a horizontal portion 30 and a flange wall 32 secured to the cross beam 20. As shown in FIG. 3, the upper portion of the wall 28 is adjoined by a wall 34 of the track 24. A top surface 36 of the cross beam 20 is slidably engaged by a horizontal wall 38 of the track 24.

With slidable engagement of the bogie 16 by means of its rails 22 in engagement with the tracks 24, the driver of the tractor 10 generally will move the trailer 12 over the bogie 16 until a desired position is reached at which point the bogie is locked to the trailer 12. As previously mentioned, the bogie 16 may include the conventional apparatus which includes brakes for the wheels 18, suspension system, subframe and other apparatus.

Each bogie is provided with at least one interlock means 40 which is secured to the bogie 16 and adapted to actuate pin means 42.

The interlock means 40 includes a generally L-shaped lever 44 having an extending arm functioning as a handle 46 and a short arm 48 which is pivotally secured by a pivot 50 to a vertically extending wall 52 of the cross beam 20.

The free end of the short arm is pivotally connected by a pivot 54 to an arm 56 which has its other end 58 pivotally secured to a locking pin 60 which is slidably disposed in a housing 62 mounted on the cross beam 20.

The short arm 48 also pivotally supports a further arm 64 by a pivot 66, as best viewed in FIG. 2. The other end of the arm 64 is pivotally connected to a locking pin 68 which in turn is slidably supported in a housing 70 mounted on the cross beam 20. The pins 60 and 68 are provided with collars 72 and 74 respectively, the collars being secured on the pins within the housing 62 and 70 respectively. The locking pin 60, as shown in FIG. 2 has a tapered end 76 biased outwardly of the housing 62 by a spring 78 which is compressed. Similarly, the pin 68 has a tapered end 80 biased outwardly of the housing 70 by a spring 82 under compression.

An adjustable means in the form of a turnbuckle device 84 has one end pivotally secured to the pivot 66 on the short arm 48 and the other end coupled to a toggle 86 on a control valve 88 which is supported by a bracket 90 secured to the cross beam 20.

The motion of the handle 44 is circumscribed by the configuration of a handle bracket 92 generally in the vertical plane. The handle bracket 92 has a flange 94, secured to the horizontal portion 30 of the rail 22. The flange 94 is integrally formed with a generally "U"-shaped member 96 which has a pair of vertically extending arms 98 and 102 which are interconnected by a bight 103. The two arms 98 and 102 define a slot 104 which limits the handle 44 for movement in upwardly and downwardly directions. The handle 44 can be locked against the bight 103 by a safety pin 106. The arm 102 is shorter than the arm 98 and has portion of its end integrally formed with a "J"-shaped member 108 having a long arm 110 spanning the slot 104 and abutting the arm 98 of the "U"-shaped member 96 to thereby limit upward movement of the handle 44. A short arm 112 in conjunction with a lip 114 on the arm 102 defines a resting place for the handle 44 when it is positioned in the upwardly direction as shown in phantom.

Figure 4:
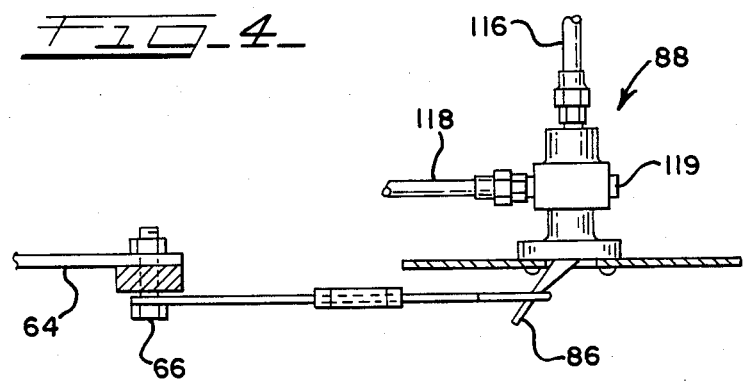
FIG. 4 is an enlarged view of a control valve coupled through a linkage to a handle.

The control valve 88 is two-way valve which is connected by a line 116 to air supply 117 of the tractor 10. As shown in FIGS. 2 and 4, the air passing from the line 116 flows through the valve 88 and flows through a line 118 which is connected to a trailer air supply line coupled to an emergency mechanical spring brake valve 122 as will be described later. The valve 88 also has an air release opening 119, communicating with the atmosphere, so that when the toggle 86 is moved in the opposite direction by the turnbuckle device 84 when the handle 44 is moved upwardly, as shown in phantom in FIG. 2, the valve 88 will be actuated to release the pressurized air present in the line 116 and to close off the connection to the line 118.

In order to explain the operation of the interlock system for the trailer and bogie, reference is made to FIG. 2, wherein the mechanical brake system commonly associated with the bogie is shown coupled to the valve 88. The wheels 18 of the bogie 16 are generally locked in parking by an independent or separate mechanical spring braking system. When it is desired to move the trailer 12, air pressure from the source 117 on the tractor 10 is applied to air chambers 126 associated with the wheels 18 to overcome the braking provided by the independent mechanical spring braking system. The bogie generally cannot be moved until the air pressure to an emergency tank 124 is applied to overcome braking pressure provided by the mechanical spring braking system.

In operation, when the driver of the tractor wants to reposition the bogie 16 (FIG. 1) to a more central position of the trailer 12, the operator will remove the safety pin 106 and pull upwardly on the handle 44 to place it in an unlocked position defined by the "J"-shaped member 108. When the handle 44 is moved upwardly, simultaneously the turnbuckle device 84 will move the toggle 86 in a direction opposite to that shown in FIGS. 3 and 4 and at the same time, as the short arm 48 is rotated counter-clockwise about its pivot 50, the arms 56 and 64 will withdraw the locking pins 60 and 68 into the housings 62 and 70, respectively. When this occurs, the tapered ends 76 and 80 of the locking pins 60 and 68, respectively will be completely withdrawn out of the holes 26 in the wall 34 of the track 24. The handle 44 is then left in its upward position in the "J"-shaped member 108, as shown in phantom, in FIG. 3. The driver will then use the tractor 10 to reposition the trailer 10 with respect to the bogie 16 to a different position. When the desired position is reached, the pins are then inserted through selective holes 26 in the wall 34 of the track 24. After the bogie 16 has been repositioned to a selected location on the trailer 12, the driver will than move the handle 44 out of the "J"-shaped member 108 and bring it downwardly to rest on the bight 103. Thereafter, the handle 44 is permanently secured by the safety pin 106.

Referring to FIG. 2, it will be seen that the source of air pressure 117 on the tractor 10 is connected by the line 116 to the valve 88. When the handle 44 is in the locked position, as shown in FIG. 2, the pressurized air is permitted to flow through the valve 88 into line 118 which applies pressure to the valve 122 which is connected to the emergency tank 124. When the pressure at the valve 122 reaches a predetermined level, pressure from the emergency tank 124 is transmitted to a braking chamber 126. When pressure is applied to the braking chamber 126, a diaphragm 128 is moved downwardly to overcome the pressure of a mechanical spring 130. When the mechanical spring pressure is overcome, the braking pressure is removed from the wheels of the bogie which then can be moved.

If we consider the situatuion in which the pins 60 and 68 have not been properly inserted through the openings 26 of the track 24, a hazardous condition exists. When this occurs, for example, when the driver fails to lock the handle 44, then the handle will remain in the upward position as shown in phantom in FIG. 2. As a result, the toggle 86 will be in a position to vent the pressurized air from the line 116 to the atmosphere through the opening. This means the pressurized air from the line 116 can not pass to the line 118 and no pressurized air will be available to release the mechanical brakes of the bogie. Furthermore, the pressurized air in the line 125 between the chamber 126 and the valve 122 connected to the emergency tank 124 will be released and the diaphragm 128, as shown in the phantom view, will bulge upwardly because of the force supplied by the spring 130, thereby resulting in an application of full braking power of the mechanical braking system.

The outstanding feature of present invention is that the interlock system is completely mechanical and is not dependent for the operation on related electrical or pressurized systems associated with the tractor.

What is claimed is:

1. In combination with a tractor driven trailer having a pair of tracks with spaced track receiving means, a structure having a plurality of wheels for supporting said trailer and having a pair of rails for slidable mounting to the tracks of said trailer, said structure including parking brake means to inhibit rotation of the wheels on such structure and parking brake chambers for receiving air pressure from a source of air pressure to selectively overcome the braking of said parking brake means;

an interlock system for securing said structure to said trailer, said interlock system comprising:

locking means having opposed housing receiving means therein secured to said structure for receiving said locking means;

said locking means being disposed to move within the housing receiving means;

means for moving said locking means within the receiving means out of engagement with the track receiving means;

control valve means connected to a fluid source;

means connecting said control valve means to said brake means;

actuating means for actuating said means for moving and;

a linkage directly coupling said means for moving said locking means with said control valve means, whereby movement of said actuating means to a structure engaging position actuates said control valve means to apply pressurized fluid to said brake means and simultaneously forces said locking means into selected track receiving means, and movement of said actuating means to a structure disengaging position causes withdrawal of said locking means from said track receiving means and simultaneously actuates the control valve means to release the pressurized fluid from said source of pressure.

2. An interlock system according to claim 1, said locking means comprising a pair of pins, each pin being provided with a collar disposed in the housing receiving means, a spring slidably positioned in said housing receiving means on the pin, one end of the spring abutting the collar and the other end abutting a wall of the housing receiving means, said spring being at all times under compression to bias outwardly the free end of the pin for engagement with one of the apertures of the track on the trailer.

3. An interlock system according to claim 2, said housing receiving means comprises a pair of housing members slidably supporting said pins, said housing members being secured at opposite ends of said structure, said means for moving said locking means comprising a first arm coupled to a handle, said first arm being medially supported by a pivot on such structure, one end of said first arm being connected pivotally by a second arm to a pivotal connection and one end of one pin, an intermediate portion of the first arm being pivotally connected to a third arm pivotally coupled to the other pin, the pivotal connection of the third arm to the short arm also serving to pivotally connect said linkage to a toggle on said control valve.

4. An interlock system according to claim 3, including a bracket secured to said structure for defining the range of movement of said actuating means, said bracket having a pair of spaced arms defining a stop for movement of the handle in upwardly and downwardly directions, said bracket means having an offset position for resting said handle in a locking means disengaging position, and a safety pin for immobolizing said handle in a locking means and engaging position.

5. In combination with a tractor driven trailer having a pair of tracks with spaced apertures, a structure having a plurality of wheels for supporting said trailer and having a pair of rails for slidable mounting to the tracks of said trailer, said structure including parking brake means to inhibit rotation of the wheels on such structure and parking brake chambers for receiving air pressure from a source of air pressure to selectively overcome the braking of said parking brake means;

an interlock system for securing said structure to said trailer, said interlock system comprising:

(a) a pair of opposed housing means secured to said structure and each housing means having opposed openings;

(b) a pin disposed in each housing means and adapted to move within the openings of said housing means;

(c) means for moving said pins, within the openings of said housing means, out of engagement with one set of the spaced apertures in the tracks to a selective set of apertures to secure said structure to said trailer;

(d) a contral valve and means for connecting air pressure from said source to said control valve;

(e) means connecting said control valve to said brake chambers;

(f) a handle for actuating said pin moving means;

(g) a linkage coupling said pin moving means with said control valve; and means in each housing means for biasing said respective pin in a direction for securing said structure to said trailer, whereby, movement of said handle to a structure engaging position actuates said control valve to apply pressurized air to said brake means and simultaneously forces said pins into selected apertures in the tracks, and movement of said handle to a structure disengaging position causes withdrawal of said pins from the apertures in the tracks and simultaneously actuates the control valve to void the pressurized air from said source of air pressure.

6. An interlock system according to claim 1 or 5, wherein said control valve is provided with a toggle,
   said toggle, in one position, applying pressurized air from the source to said brake means,
   said toggle, in another position, shutting off application of pressurized air to the brake means and voiding the pressurized air to the atmosphere to thereby permit said brake means to resume mechanical braking by releasing air pressure.

7. An interlock system according to claim 1 or 5, wherein said linkage is adjustable,
   one end of said linkage being coupled to a toggle on said control valve.

8. An interlock system according to claim 5, wherein each pin is provided with a collar disposed in the housing means,
   said biasing means comprising a spring slidably positioned in said housing means on the pin,
   one end of the spring abutting the collar and the other end abutting a wall of the housing means,
   said spring being at all times under compression to bias outwardly the free end of the pin for engagement with one of the apertures of the track on the trailer.

9. An interlock system according to claim 5, wherein said housing means comprise a pair of housing members slidably supporting said pins,
   said housing members being secured at opposite ends of said structure,
   said pin connecting means comprising a short arm coupled to said handle,
   said short arm being medially supported by a pivot on said structure, one end of said short arm being connected pivotally by an arm to a pivotal connection on one end of one pin,
   an intermediate portion of the short arm being pivotally connected to a further arm pivotally coupled to the other pin, the pivotal connection of the other arm to the short arm also serving to pivotally connect said linkage to a toggle on said control valve.

10. An interlock system according to claim 9, and a bracket secured to said structure for defining the range of movement of said handle,
    said bracket having a pair of spaced arms defining stop for movement of the handle in upwardly and downwardly directions,
    said bracket having an offset position for resting said handle in a pin disengaging position,
    and a safety pin for immobilizing said handle in pin engaging position.

11. An interlock means for selectively locking a beam movably disposed along a pair of tracks provided with a plurality of spaced apertures,
    said interlock means comprising a generally "L"-shaped member having a long arm functioning as a handle and a short arm pivotally supported, at the distance from its free end, on said beam,
    a pair of housings, each one supported at an end of said beam,
    a locking pin slidably supported in opposed openings in each housing,
    a lever having one end pivotally secured to one end of said pins and the other end pivotally secured to a free end of said short arm,
    a further lever pivotally secured to one end of said other pins and pivotally secured to said short arm on the other side of the pivotal mounting of said short arm on said beam,
    a spring in each housing biasing the free end of the pin outwardly of the respective housing,
    a bracket for defining the limits of movement of said handle,
    and a safety pin for locking the handle in a position denoting engagement of said pins with apertures on said tracks,
    said bracket having an off-set for supporting said handle in a position denoting disengagement between said beam and said tracks.

12. An interlock means according to claim 11, each locking pin is provided with a collar on a midportion of the pin inside the housing,
    said spring being under compression between one wall of said housing and said collar to urge said pin into engagement with one of the apertures.

* * * * *